July 9, 1968
C. H. BRADER
3,391,684
ORCHARD HEATING SYSTEM WITH PIVOTABLE RISER
LINES AND METHOD OF ASSEMBLY
Filed March 2, 1967
2 Sheets-Sheet 1
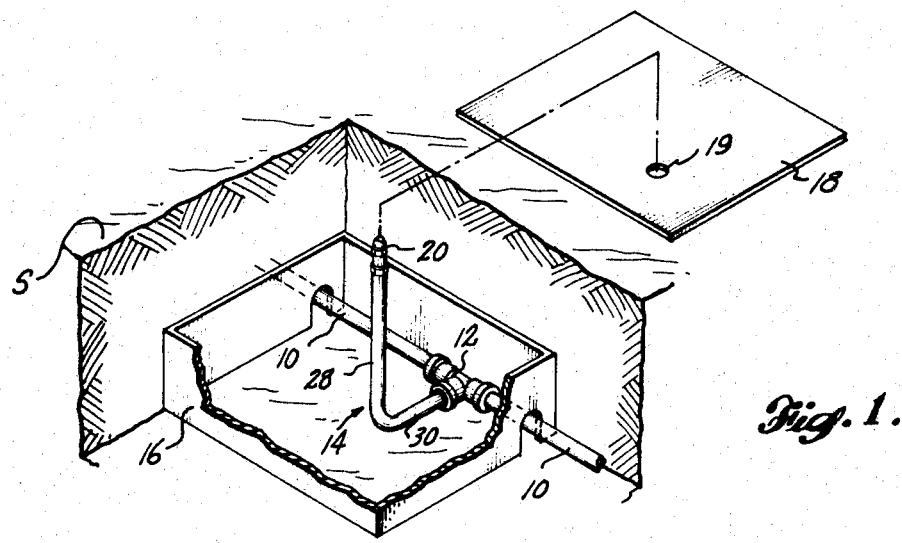
Fig. 1.
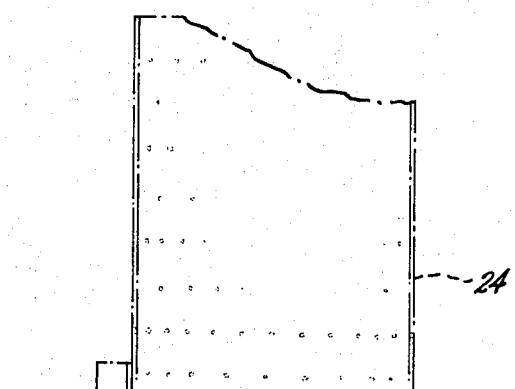
Fig. 2.
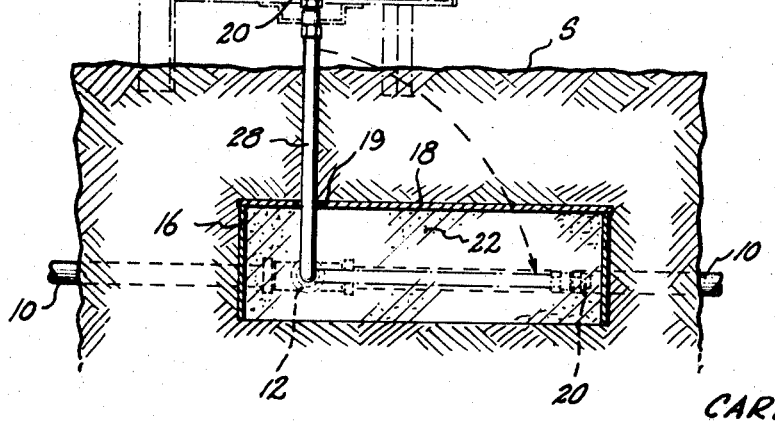
INVENTOR.
CARL H. BRADER
BY
ATTORNEYS

INVENTOR.
CARL H. BRADER
BY
ATTORNEYS

United States Patent Office 3,391,684
Patented July 9, 1968

3,391,684
ORCHARD HEATING SYSTEM WITH PIVOTABLE
RISER LINES AND METHOD OF ASSEMBLY
Carl H. Brader, Prosser, Wash., assignor to Brader's
Orchard Heaters Inc., a corporation of Washington
Filed Mar. 2, 1967, Ser. No. 620,033
6 Claims. (Cl. 126—59.5)

ABSTRACT OF THE DISCLOSURE

An orchard heating system having underground oil lines for distributing fuel to a plurality of heaters placed in an orchard, wherein L-shaped riser lines connectible to the heaters, respectively, are coupled with the distribution lines by special coupling means rendering the riser lines pivotable between a horizontal underground position for off-season periods and an upright position for connection to the heaters during frost season. The coupling means includes a coupling member having a sleeve portion connectible to the distribution line and a neck portion adapted to receive the base portion of the L-shaped riser line therein horizontally and is threaded internally to hold the riser line therein while permitting rotation thereof. An O-ring seal is positioned in the neck portion in an arrangement providing a fuel tight seal while permitting rotation of the riser line.

The method of assembling the coupling involves threading the inside passageway to receive the threaded end of the riser line, tapering the lip of the riser-receiving neck portion of the coupling member, cooling the riser line and bushings, fitting the riser line, bushings and O-ring together and inserting them in the neck portion of the coupling member while cooled, by threading the riser line end into the neck portion, and cementing the outer bushing to the lip of the neck portion of the coupling member.

Background of the invention

This invention relates to orchard heating systems involving a plurality of heaters to be distributed throughout the orchard and distribution lines to be buried beneath the ground in the orchard to deliver oil or other fuel to the heaters and permit cultivation within the orchard in nonfreezing periods. More particularly, it relates to means in such a system for coupling L-shaped riser lines to underground distribution lines to deliver fuel from the latter to the heaters during freezing season and pivotable to be buried underground alongside the distribution lines when not in use. It also relates to a method of assembly of the coupling means. While the invention is herein described in terms of the preferred form thereof, it will be recognized by those skilled in the art that various changes and modifications may be made therein without departing from the principal features involved.

It is common practice to heat orchards for protection of the fruit against frost by means of distributed heaters to which fuel is fed through distribution lines which are buried beneath the surface of the ground to remain in the orchard year-round and still permit cultivation of the ground. Often the heaters, or at least the riser lines connecting the heaters to the distribution lines, are left within the orchard during non-freezing seasons, requiring cultivation around them as well as around the trees. Alternatively, it has been common to dig down and disconnect the riser lines from the distribution lines so that cultivation would not be hampered by their presence above ground, or to install the entire system above ground for seasonal installation and removal. In attempting to devise a riser line which could be pivoted between a buried position for off-season periods and an upright position for use, difficulties have been encountered in providing a coupling which would permit pivotable movement while maintaining a fuel-tight seal, particularly one which would not be influenced by wide ranges of temperature, or by long periods of nonuse.

The chief object of this invention is to provide an orchard heating system wherein the riser lines for delivering fuel to the heaters remain connected to buried distribution lines and yet themselves can be buried during off-season periods to permit cultivation of the ground in the orchard.

A related object hereof is to provide such an orchard heating system including a pivotable coupling for connecting an L-shaped riser line to a buried distribution line and overcoming the above-mentioned difficulties of providing proper fuel sealing in the pivotable coupling.

Still another object hereof is to provide such an orchard heating system wherein the riser line coupling arrangement is of improved simplicity for ease of manufacture, installation and operation and requiring minimum maintenance.

Another object hereof is to provide an improved method of assembly of the coupling involved in the system whereby fuel sealing capability is assured.

Summary of the invention

To achieve the above objects and purposes the invention provides an orchard heating system which comprises a plurality of heaters to be placed at spaced locations in an orchard, distribution lines adapted to be buried beneath the ground and connected to deliver fuel to said locations from a source of fuel under pressure, individual riser lines adapted to deliver fuel from the distribution lines to the heaters, and means for coupling each riser line to a distribution line at the heater locations. Each coupling means includes a coupling member having at least one sleeve adapted to be connected to a distribution line, having a neck portion adapted to be placed horizontally underground and to receive the riser line therein, and an internal fuel delivery passageway having a portion aligned with the neck portion and threaded internally. Each riser line is an L-shaped member having a stem portion adapted to be coupled to a heater and a leg portion threaded on the end to be received in the threaded portion of the passageway to permit rotation of the stem portion between horizontal and upright positions. An annular seal is contained between the neck portion and the riser line leg portion spaced from the threaded end thereof and provides a fuel-tight seal therebetween while permitting relative rotation.

The sealing means preferably comprises inner and outer cylindrical bushings fitted within the neck portion of the coupling member, with the riser line leg portion received therein and with an O-ring seal seated between the bushings, and means securing the outer bushing to the coupling member neck portion to hold the bushings and O-ring within it.

The invention also resides in certain details of construction and assembly technique which will be more apparent from the following detailed description of the preferred form of the invention and assembly thereof, taken in connection with the accompanying drawings.

Brief description of the drawings

FIGURE 1 is an isometric view of a riser line coupling arrangement shown buried beneath the ground and contained within a box shown partially fragmented and with the lid removed.

FIGURE 2 is a sectional view of the buried assembly, contained in the box, with the riser line in upright position connected to an orchard heater and showing its horizontal position by dotted lines.

*Detailed description of the invention*

Figure 3:
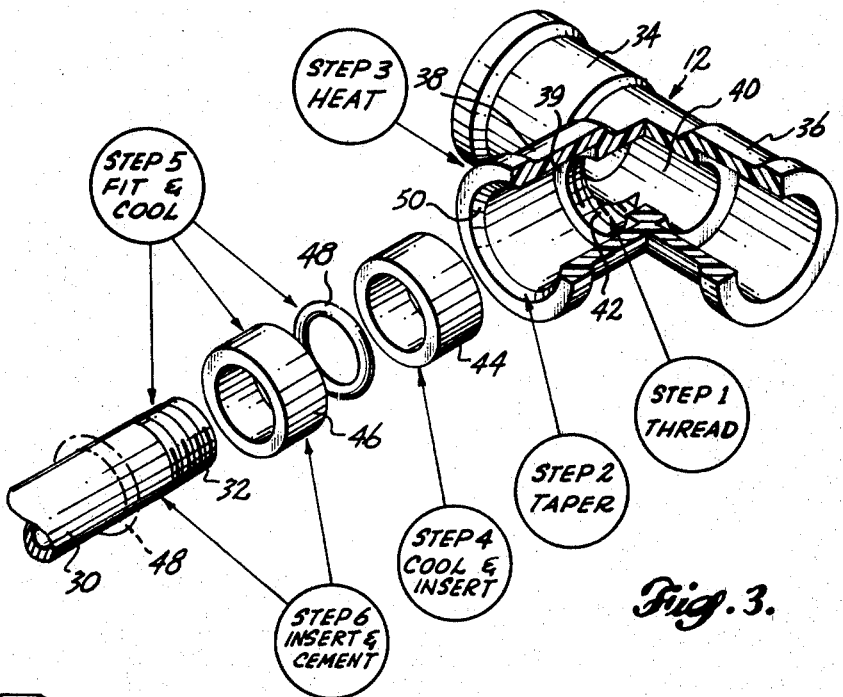
FIGURE 3 is an exploded isometric view, partially sectioned, showing the parts of the coupling according to the invention and indicating the steps in the preferred method of assembly.
Figure 4:
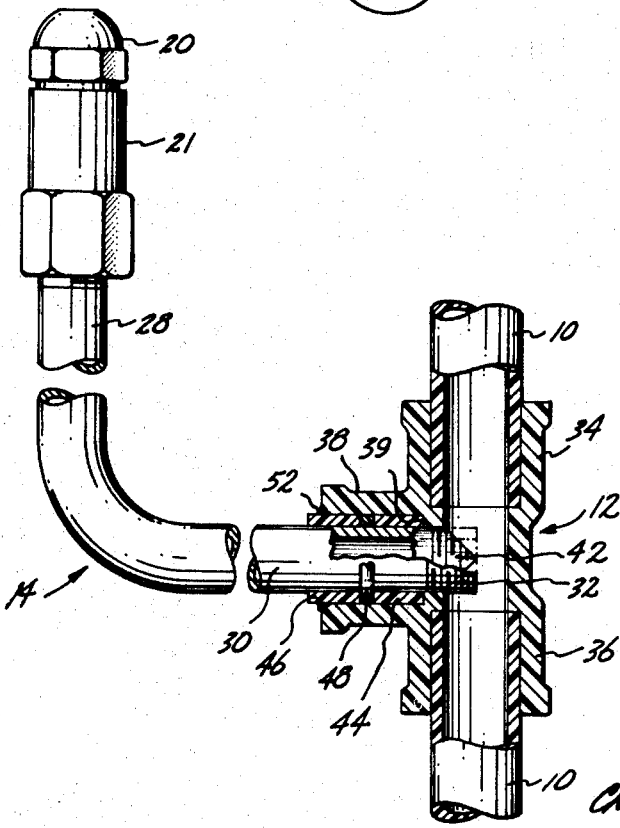
FIGURE 4 is a fragmented, partially sectioned view of the coupling when assembled, showing the interfitting of the parts thereof.

Since the basic elements of an orchard heating system as well known to those skilled in the art, a detailed discussion thereof is not needed herein. For informational purposes, reference may be had to any of a number of different patents in this field, such as U.S. Patent No. 2,016,002, of C. A. Fugit, Oct. 1, 1935, showing an orchard heating system wherein underground distribution lines connected to a fuel source deliver fuel through riser lines to heaters spaced along the length of each distribution line between rows of trees in an orchard. Such riser lines have in the past generally remained permanently connected in fixed position in the orchard and the heaters have often been left connected thereto throughout the year, hampering normal cultivation.

The present invention provides a riser line coupled to be pivoted from its vertical position extending above ground to a horizontal position buried below ground, and the heaters are removed from the field and stored during off-season periods. The distribution lines 10 buried below the surface S of the ground have adjacent lengths thereof connected by a T coupling member 12 to which the L-shaped riser line 14 is also connected. The riser line and coupling assembly are buried in a box 16 which is notched on the ends to be set over the distribution line and has a lid 18 with a hole 19 in it to be placed down over the upright riser line. The box and lid arrangement are optional and mainly serve to keep the riser line and connected nozzle 20 clean and free from the moisture in off-season periods. The box can be filled with vermiculite 22 or other inorganic material, if desired.

A heater 24 of cylindrical shape and having three legs 26 adapted to be embedded in the ground for stability against the wind is set over the coupling location so as to have the nozzle 20 on the tip of the riser line extend through a hole in the heater base plate to spray fuel upwardly into the combustion chamber. The details of the heater itself are not critical to this invention.

The L-shaped riser line 14 comprises stem portion 28, to which the nozzle 20 and adaptor 21 are connected, and a leg or base portion 30 adapted to be inserted horizontally into the coupling member 12 and having its tip 32 threaded for retention therein.

While the riser line 14 is preferably made from a length of metal pipe, the coupling member 12 and distribution lines 10 are preferably made from a thermoplastic or other noncorrosible material such as "Kralastic." This term is a trademark applied to a series of ABS resins commonly used in injection and extrusion applications and characterized by rigidity, toughness and lightness of weight. Pipe and couplings of this material are readily available for underground uses.

The coupling member 12 is made from an ordinary T coupling having first and second opposing sleeve portions 34 and 36 and a third sleeve portion or neck 38 perpendicular thereto. The opposing sleeves receive the ends of adjacent lengths of distribution line 10 therein, while neck portion 38 is altered to receive the base or leg 30 of the riser line. The three sleeve or neck portions are interconnected by a central section having a three-way internal passageway 40 of smaller inside diameter substantially equal to the inside diameter of the distribution line. That portion 42 of this internal passageway aligned with neck portion 38 is threaded internally to receive the externally threaded end 32 of the riser line 14. The threaded connection of the riser line in the coupling member prevents it from popping out of the coupling under pressure of fuel in the lines, which may be as high as about 200 lbs. per square inch when oil is used. It also reduces the pressure on the sealing arrangement and permits rotation of the riser between its upright and its horizontal positions.

The sealing arrangement includes inner and outer bushings 44 and 46 both having outside and inside diameters equal to those of the distribution line 10 and thus are adapted to fit snugly within neck portion 38 of coupling member 12. The O-ring rubber seal 48 has an inside diameter slightly smaller than the outside diameter of the riser line 14 yet is flexible enough to be fitted over it, and has a cross-sectional area about equal to the cross-sectional area of the annular cavity arranged for it between bushings 44 and 46. The lip 50 around the opening of neck portion 38 is tapered to facilitate cementing the outer bushing 46 therein by means of a suitable ABS based cement forming a weld 52.

Because of the close tolerances between the parts and the importance of achieving a tight seal which will permit rotation of the riser line and yet prevent leakage of fuel in spite of the substantial pressures involved, a special method is used to assemble the coupling. After the internal passageway 40 is threaded at 42 to receive the tip 32 of the riser line 14, and the lip 50 of neck portion 38 is tapered, coupling member 12 is heated by suitable means not shown (prior to assembly with distribution line 10) in order to expand it slightly. Bushing 44 is cooled by immersion in ice water or by other means and is inserted into neck portion 38 against the shoulder 39 therein while coupling member 12 is still warm. At the same time, the bushing 46 and O-ring seal 48 are placed over the end of riser line leg portion 30, and this subassembly is cooled and inserted in neck portion 38. With O-ring seal 48 sandwiched between the bushings 44 and 46, the latter bushing is secured to the coupling member by cement applied in the annular cavity around tapered lip 50 of neck portion 38. After the parts equalize in temperature, a very tight seal is achieved, yet the L-shaped riser is pivotable in the coupling member 12 within the limits of the threading at its tip 32.

Since the threading is located on the "wet" side of the O-ring seal 48, it is continuously lubricated. Any pressure exerted by the oil through the threading tends to force bushing 44 against the O-ring seal 48, deforming the latter to depress it more tightly against the second bushing 46 as well as the inside of neck portion 38, thereby increasing its sealing effect. Rotation of the riser between upright and horizontal positions may turn the bushing 44 and the O-ring seal 48 within the coupling, but cannot cause leakage by doing so. Captivation of bushing 44 and O-ring seal 48 in the annular cavity formed between shoulder 39 and bushing 46 both permits free rotation of the riser line and improves the sealing capabilities of the coupling.

What is claimed is:

1. In an orchard heating system which includes a plurality of heaters to be placed at spaced locations in an orchard, and distribution lines adapted to be buried underground and connected to deliver fuel under pressure to said locations; the combination comprising individual riser lines and means coupling each riser line to a distribution line at said locations, respectively; each coupling means including a coupling member having a sleeve portion adapted to be coupled to the distribution line, a neck portion adapted to receive the riser line, an internal fuel delivery passageway having a portion aligned axially with the neck portion and threaded internally; each riser line including an L-shaped member having a stem portion adapted to be coupled to a heater for delivery of fuel thereto and a leg portion threaded on the end to be received horizontally in the theaded portion of said passageway to permit rotation of the stem portion between upright and horizontal positions; and annular sealing means positioned between the inside of said neck portion and the outside of said leg portion, spaced from the threaded end thereof and operable to permit rotation of the leg portion within the neck portion while preventing leakage of fuel therebetween.

2. An orchard heating system comprising a plurality of heaters to be placed at spaced locations in an orchard; distribution lines adapted to be buried underground and connected to deliver fuel under pressure to said locations; individual riser lines for delivering fuel from the distribution lines to the heaters; and means coupling each riser line to a distribution line at said locations, respectively; each coupling means including a coupling member having a sleeve portion adapted to be coupled to the distribution line, a neck portion adapted to receive the riser line, an internal fuel delivery passageway having a portion aligned axially with the neck portion and threaded internally; each riser line including an L-shaped member having a stem portion adapted to be coupled to a heater and a leg portion threaded on the end to be received horizontally in the threaded portion of said passageway to permit rotation of the stem portion between upright and horizontal positions; and annular sealing means positioned between the inside of said neck portion and the outside of said leg portion, spaced from the threaded end thereof and operable to permit rotation of the leg portion within the neck portion while preventing leakage of fuel therebetween.

3. The orchard heating system defined in claim 2 wherein said fuel sealing means comprises inner and outer cylindrical bushings adapted to fit within said neck portion and to receive said riser line leg portion axially therein, an O-ring resilient seal member positioned between said bushings and having the riser line leg portion received therein, and means securing the outer bushing to said neck portion around the end thereof.

4. The orchard heating system defined in claim 3 wherein said neck portion has an inside diameter greater than the threaded portion of said internal passageway to form an annular shoulder therein and wherein the outer bushing secured to said neck portion forms an annular cavity between itself and said shoulder within which the first bushing and said O-ring seal member are free to rotate within the neck portion upon rotation of said riser line.

5. The orchard heating system defined in claim 2 wherein said system further includes a plurality of box-like members having downwardly opening notches therein to be buried beneath the ground with the distribution line received within said notches and adapted to contain the coupling member and said L-shaped riser line therein.

6. In the manufacture of an orchard heating system including an L-shaped riser line coupled to a fuel distribution line and adapted to be pivoted between a horizontal below ground position and upright position for connection to an orchard heater, the method of forming a coupling for said riser line comprising heating a coupling member adapted to be coupled to the distribution line and having a cylindrical neck portion adapted to receive the riser line threadably therein, cooling a first cylindrical bushing adapted to fit within the neck portion and to receive the riser line therein, inserting said first bushing while it is cooled into the coupling member while it is heated, assembling with the riser line a second cylindrical bushing and an O-ring seal member which are also adapted to receive the riser line therein and adapted to fit within said neck portion, cooling the resulting assembly and inserting the same into said neck portion by threading the riser line into the coupling member while the latter is still heated and with the O-ring seal member seated between the bushings at a location spaced from the threaded end of the riser line, and securing the second bushing to the coupling member while compressing said O-ring seal member.

References Cited

UNITED STATES PATENTS

| 2,016,002 | 10/1935 | Fugit | 126—59.5 |
| 2,102,989 | 12/1937 | Bose | 126—59.5 X |
| 2,217,536 | 10/1940 | Birrell | 126—59.5 |
| 3,200,539 | 8/1965 | Kelly | 126—59.5 X |

CHARLES J. MYHRE, *Primary Examiner.*